Dec. 16, 1930.    H. H. STYLL    1,784,916
LINK BRIDGE FOR OPHTHALMIC MOUNTINGS
Filed Dec. 15, 1927
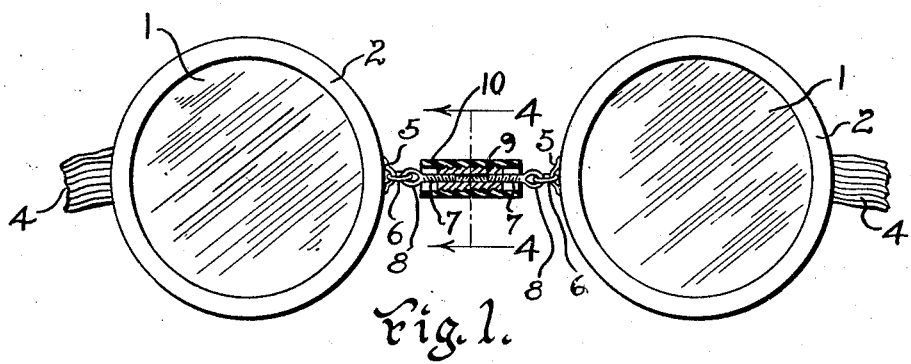
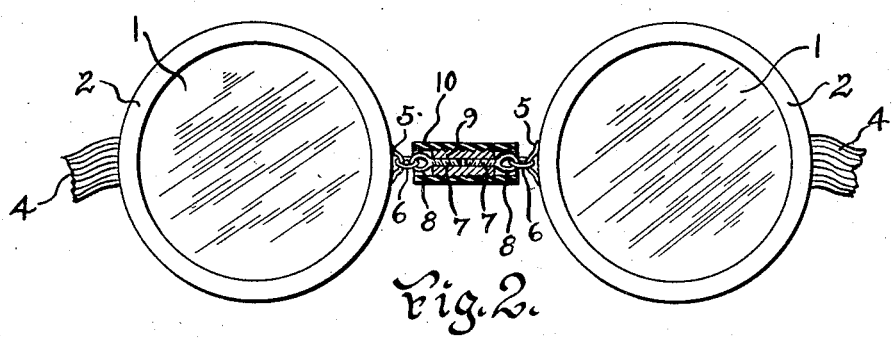
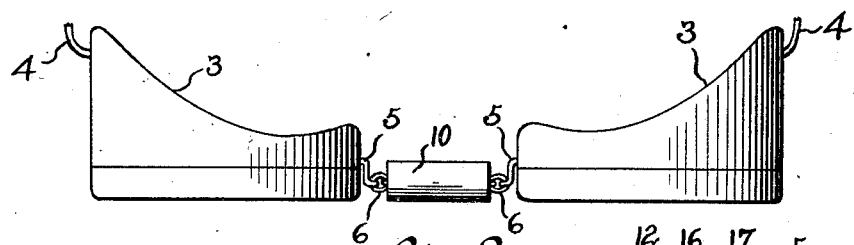
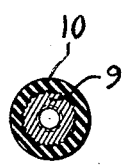
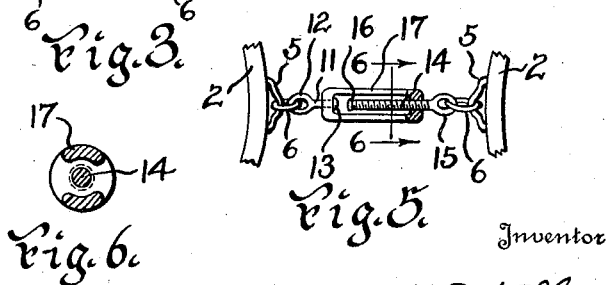
Inventor
Harry H. Styll.

Patented Dec. 16, 1930

1,784,916

UNITED STATES PATENT OFFICE

HARRY H. STYLL, OF SOUTHBRIDGE, MASSACHUSETTS

LINK BRIDGE FOR OPHTHALMIC MOUNTINGS

Application filed December 15, 1927. Serial No. 240,149.

This invention relates to improvements in bridge means for connecting the lens frames of ophthalmic lenses and has particular reference to improved means for regulating the distance between the respective centers of said lenses.

The principal object of the invention is to provide a bridge member for an ophthalmic mounting which will allow the lens holding members to be folded one with respect to the other and will permit of the distance between the said lens holding members being changed to accommodate the required distance between the centers of the eyes of the wearer.

Another object of the invention is to provide improved means by which the distance between the lens holding members may be adjusted to suit the required pupillary distance of the wearer and then be maintained in that adjustment.

Another object of the invention is to provide a bridging member for the lens holding members of an ophthalmic mounting which may be flexible or foldable as well as adjustable as to the distance between the respective lens holding members.

Other objects and advantages of the invention will be apparent from the following description taken in connection with the accompanying drawings and it will be understood that many changes may be made in the arrangement of parts and details of the construction without departing from the spirit of the invention as expressed in the accompanying claims. I, therefore, do not wish to be limited to the exact details of construction and arrangements of parts shown as the preferred forms only have been shown by way of illustration.

In that type of ophthalmic mountings usually known as protective goggles it has been customary to connect the two lens holding members by means of a chain so that simply by twisting one lens holding member with respect to the other the chain will be twisted and shortened thus changing the distance between the two lens holding members. This has proved a very useful and practical device. It has, however, one outstanding disadvantage, namely, that when the mounting is taken off the face of the wearer the chain untwists and the distance between the lens holding members is changed. In other words, the adjustment for the pupillary distance of the wearer is lost so that this pupillary distance has to be adjusted by twisting the chain each time that the wearer puts on the mounting.

In my improved device I preserve the flexibility of the chain bridge but I provide improved means therein by which the adjustment for the pupillary distance is maintained and not lost each time the mounting is taken off the face. With my device, therefore, the lens holding members may be folded with respect one to the other just as with the prior art chain bridge and the pupillary distance of the mounting be maintained.

Referring to the drawings:

Fig. 1 is a front view partially in cross section showing the device in its outermost adjustment;

Fig. 2 is a view similar to Fig. 1 showing the bridge adjusted in its innermost position;

Fig. 3 is a top view of Figs. 1 and 2;

Fig. 4 is a cross section on line 4—4 of Fig. 1;

Fig. 5 is a partial view similar to Figs. 1 and 2 showing a modification;

Fig. 6 is a cross section on line 6—6 of Fig. 5.

Referring to the drawings wherein similar reference characters denote corresponding parts, the lenses 1 are mounted in and held in the lens frames 2, which frames may be in the form of an eye cup along the line 3 to fit the face, as shown in Fig. 3. It will be understood that any convenient form of lens holding rim may be used in connection with this device. 4 represents the head band or straps by which the device is held in place on the face. On each lens holding member is a staple or hook 5 which is preferably bent out as shown in Fig. 3 so that the bridge member may be thrown out to clear the nose. Secured in the staple 5 is the link 6 and secured to the link 6 is the screw member 7 having an eye 8 secured in the link 6. Over the screw member 7 is the swivel member 9 having a right and left hand thread on its inside and over the swivel member 9 is the nose engaging pad 10 preferably made of soft rubber tubing.

The operation is as follows: When the swivel member 9 is rotated the screw members 7 are either advanced towards each other or separated one from the other, depending on the direction in which the swivel member 9 is rotated. In this way the lens holding members 2 may be brought closer together or farther apart and may be adjusted so that the center of the lenses 1 will lie before the center of the pupil of the eye of the wearer and the nose engaging member 10 being of soft rubber presents a soft bearing pad for contact with the skin of the nose. This invention provides not only means for changing the distance between the lens holding members 2 but provides through the staple 5, the ring 6 and the eye 8 flexible means by which one lens member may be folded with respect to the other.

Fig. 5 shows a slight modification comprising the lens holding members 2, the staples 5 and the ring 6. On the left hand side is shown a swivel bolt 11 having the eye 12 and the turned over end 13, and on the right hand side the screw bolt 14 having the eye 15 fitting in the ring 6, which bolt is screw threaded and has a turned-over head on the end 16. The swivel bolt 11 and the screw member 14 are connected with the swivel spanner 17. The operation is as follows: When the swivel spanner 17 is turned the screw bolt 14 is either drawn into or moved out of the swivel spanner 17 thus changing the distance between the lens holding member 2 whether or not it is drawn in or moved out depending on the direction in which the swivel spanner is turned. This swivel spanner 17 may be covered with a rubber tube as in the case of Figs. 1 and 2.

If desired the member 9 on the swivel spanner 17 may be knurled so that when the rubber tube 10 is pushed thereover it will tightly engage thereon, or it can be made smooth as desired. Also if desired the device may be used without the cover 10.

In Figs. 1 and 2 the member 9 may be made similar to the member 17 in Fig. 5 so that the ends of the screw members 7 may be offset to prevent them coming out of the member 9.

From the foregoing description it will be seen that I have provided simple, efficient and inexpensive means for providing a bridging member for ophthalmic mountings which may be adjusted as to the pupillary requirements at the same time being flexible allowing one lens holding member to be folded with respect to the other.

Having described my invention, I claim:

1. In a device of the character described for use in combination with a pair of lens holding members, a pair of link rods having their terminal ends facing and separated from each other each having a terminal eye, an attaching member on each lens holding member having an eye linked in an eye of one of said link rods for universal movement and threaded means adapted to change the distance between the facing ends of the two rod links.

2. In a device of the character described for use in combination with a pair of lens holding members, a link holding member fixedly attached to each lens holding member, a loose link attached to the link holding members, link rods having their terminal ends facing and separated from each other and having eye portions connected for free movement with the loose link, and threaded means adapted to change the distance between the facing ends of the two rod links.

3. In a device of the character described for use in combination with a pair of lens holding members, a loose link connected to each lens holding member, a pair of link rods each having a terminal eye linked in one of the loose links and a connecting member between the link rods, one of said rods being threadedly engaged therewith and the other freely movable whereby the distance between the lens holding members may be changed by twisting them one with the other.

HARRY H. STYLL.